United States Patent [19]

Schade et al.

[11] Patent Number: 5,056,541
[45] Date of Patent: Oct. 15, 1991

[54] METHOD AND APPARATUS FOR REMOVING POLLUTANTS FROM CONTAMINATED SOIL

[76] Inventors: Horst Schade, In der Marpe 16, 4320 Hattingen, Fed. Rep. of Germany; Wilko Werner, Forstweg 7a, 1000 Berlin 28, Fed. Rep. of Germany

[21] Appl. No.: 494,603

[22] Filed: Mar. 16, 1990

[30] Foreign Application Priority Data

Mar. 20, 1989 [EP] European Pat. Off. ........ 89104982.7

[51] Int. Cl.$^5$ .............................................. B08B 9/00
[52] U.S. Cl. .................................... 134/25.1; 134/10; 210/772
[58] Field of Search ................... 134/10, 25.1; 210/772

[56] References Cited

U.S. PATENT DOCUMENTS

| | | | |
|---|---|---|---|
| 4,569,696 | 2/1986 | Sandstrom et al. | 134/25.1 |
| 4,801,384 | 1/1989 | Steiner | 134/42 |
| 4,869,825 | 9/1989 | Steiner | 134/25.1 |
| 4,975,198 | 12/1990 | Steiner | 134/25.1 |

FOREIGN PATENT DOCUMENTS

| | | |
|---|---|---|
| 0185831 | 12/1984 | European Pat. Off. |
| 89/04730 | 6/1989 | European Pat. Off. ........... 134/25.1 |
| 89/04221 | 5/1989 | World Int. Prop. O. ......... 134/25.1 |

*Primary Examiner*—Asok Pal
*Attorney, Agent, or Firm*—Clifford A. Poff

[57] ABSTRACT

A method and apparatus for removing pollutants from contaminated soil in which the soil is first purified from coarse constituents by screening or crushing and then subjected to extraction with washing water mixed with additives, after which the soil is separated from the washing water and additionally rinsed with rinsing water whereupon the rinsing water is freed in a purification process from the pollutants extracted from the soil. The extraction with washing water, which may contain additives if required, is substantially separate from the single or mulit-stage rinsing and sorting process; a very fine fraction having a particle size up to 150 μm, and preferably up to 10 μm, is separated by dry or wet sorting before extraction; and the dried very fine fraction is distilled at a temperature of 300° C. to a maximum of 600° C., preferably distilled in vacuo at a temperature of 380° C., for purification from organic pollutants and from cyanide and mercury compounds.

33 Claims, 2 Drawing Sheets

METHOD AND APPARATUS FOR REMOVING POLLUTANTS FROM CONTAMINATED SOIL

BACKGROUND OF THE INVENTION

1. Field of the Invention

The present invention relates generally to method and apparatus for removing pollutants from contaminated soil and, more particularly, to a method and apparatus for removing pollutants from contaminated soil in which the soil is first purified from coarse constituents by screening or crushing and then subjected to extraction with washing water mixed with additives, after which the soil is separated from the washing water and additionally rinsed with rinsing water, whereupon the rinsing water is freed in a purification process from the pollutants extracted from the soil.

2. Description of the Prior Art

A method for decontaminating soil is described in European Patent Application 84 730 152.0, publication number 0 185 831. The prior-art methods, including European Publication number 0 185 831, can theoretically remove nearly all pollutants from soil. In practice, however, there are important and serious limitations to these methods since the soil constituents having a particle size ranging from 0 to 10 or 20 $\mu$m mostly have a laminar structure and, owing to the large outer and inner surface area, have a high absorption capacity for pollutants. High-boiling solid pollutant carriers such as tar, asphalt and coal sometimes coagulate with grains of quartz or other soil constituents and, like wood, charcoal and other mainly organic pollutant carriers, have a large internal surface area and are present in virtually all contaminated soil. Even when large amounts of mechanical energy are used, e.g., in the form of ultrasonic vibration or impacts, pollutants cannot be removed or dissolved from the soil in sufficient quantity by using water mixed with "eco-friendly" chemicals. The fine substances, therefore, have to be separated by wet or dry sorting and, in the case of wet separation, have to be concentrated and dewatered, so that they continue to be in the form of a waste material which requires additional specialized treatment. The organic pollutant carriers (low-density materials), which usually form coagulations with quartz having a density of less than 1.6 kg/dm$^3$, are thus dissolved or separated only in small proportions according to existing methods.

It is, therefore, an object of the present invention to provide an improved method for decontaminating soil whereby contaminated soil can be freed from pollutants in a technically and economically acceptable manner even when the soil contains very fine solid constituents having a laminar structure and a particle size usually below 20 $\mu$m and also contains high-boiling pollutants and pollutant carriers (low-density materials).

Still other objects and advantages of the present invention will become apparent in light of the attached drawings and written description of the invention presented herebelow.

SUMMARY OF THE INVENTION

According to the present invention, there is disclosed an improvement to a soil decontamination method of the initially-described kind, wherein the extraction process with washing water, containing additives if required, is substantially separate from the single or multistage rinsing and sorting process, whereby a very fine fraction having a particle size up to 150 $\mu$m, preferably up to 10 $\mu$m, is separated by dry or wet sorting before extraction, and the dried very fine fraction is distilled at a temperature of 300° C. to a maximum of 600° C., preferably in vacuo at a temperature of 380° C. to a maximum of 600° C., preferably in vacuo at a temperature of 380° C., and is thereby purified from organic pollutants and from cyanide and mercury compounds.

In a preferred embodiment, the present invention provides the following features in combination:

a) The contaminated soil, after separation of a fraction having a particle size up to 150 $\mu$m, and preferably up to 10 $\mu$m, for purposes of removing pollutants by extraction, is washed at high energy with water optionally containing additional chemicals and, after the washing water has been substantially removed, is freed from low-density materials and adhering extraction solution by rinsing in countercurrent and simultaneous sorting by density and subsequent dewatering, after which the underflow from the sorter having a particle size of 100 $\mu$m to 4 mm is dewatered and discharged (if required, after a second rinsing and sorting process connected in cascade); whereas the overflow containing the fine substances after sorting is freed from low-density materials by flotation, and the sediment from the flotation process, which contains the fraction having a particle size of 10 up to a maximum of 150 $\mu$m, is rinsed in a counter-current hydrocyclone plant.

b) Before extraction, a very fine fraction having a particle size up to 150 $\mu$m, and preferably up to 10 $\mu$m, is separated by dry or wet sorting and, if wet-sorted, is concentrated and dried.

c) The dried very fine fraction is de-agglomerated and vacuum-distilled at a temperature of about 380° C. and at a vacuum of 20 to 100 Torr abs, and is then cooled and discharged as a purified finished product.

In the method according to the invention, the very fine fraction can be freed from organic pollutants and other harmful compounds including cyanide and mercury compounds by distillation in vacuo at a temperature in the 380° C. range. Owing to the large surface area of the fine particles, this result is surprising and could not be foreseen by one of ordinary skill in the art.

According to another feature of the present invention, before the vary fine fraction having a particle size of 150 $\mu$m is separated, the coarse constituents having a particle size above 4 mm are separated from the soil and, after removal of the low density materials, are separately rinsed, dewatered, additionally washed and discharged as a gravel fraction. Optionally according to the invention, the coarse constituents having a particle size over 4 mm may be also separated after extraction and, after removal of the low-density materials, are separately rinsed, dewatered, additionally washed and discharged as a gravel fraction.

According to yet another feature of the present invention, the underflow from counter-current rinsing and sorting by density having a particle size of 100 $\mu$m to 4 mm is dewatered and sorted and the rinsing water from sorting is introduced in a cascade into the upstream rinsing step; whereas the product after sorting is again rinsed in counter-current and sorted by density, then dewatered, mixed with the finished product after distillation, and discharged as purified soil.

According to still another feature of the present invention, the oily overflow occurring during concentration is floated in a flotation stage upstream of the waste-water preparation plant. In accordance with another feature found advantageous, the dewatered very fine fraction is dried in a dryer by steam or another heating medium and the resulting vapors produced in the dryer by steam o another heating medium and the resulting vapors produced in the dryer are freed from solids, and the solids are returned to the dryer. Concurrently, the freed vapors re condensed to recover the energy. The condensate occurring during condensation is then supplied to the waste-water preparation plant; whereas the waste air is heated to a temperature of about 120° C. and returned as scavenging air to the process. The use of thermal oil or fused salt baths as heat transfer media for indirect heating has been found particularly advantageous. Preferably, according to the invention, the residence time of the dried very fine fraction in the vacuum distillation unit is between ½ and 2 hours The invention also provides an installation or apparatus for performing the method, in which the fraction having a particle size up to 150 $\mu$m is separated before extraction of the soil in a hydrocyclone and the underflow from the hydrocyclone is treated in a mashing container supplied with mechanical energy, preferably via an adjustable-speed agitator and/or with energy of vibration, while the overflow from the density-sorter or extractor flows down to a hydrocyclone whose underflow is then supplied to the flotation device, and the device for processing the waste water comprises a flotation stage followed by an oxidation or reduction stage, then a precipitation and flocculation stage, a sedimentation stage, a filtration stage and a blow-off column (stripper), an active carbon filter stage and a selective exchanger stage. According to the preferred embodiment of the present invention, the drier is a worm drier comprising hollow worms whose surfaces and walls transfer heat.

BRIEF DESCRIPTION OF THE DRAWINGS

A preferred embodiment of the present invention is shown in the attached drawings, in which.

DESCRIPTION OF THE PREFERRED EMBODIMENT

Figure 1:
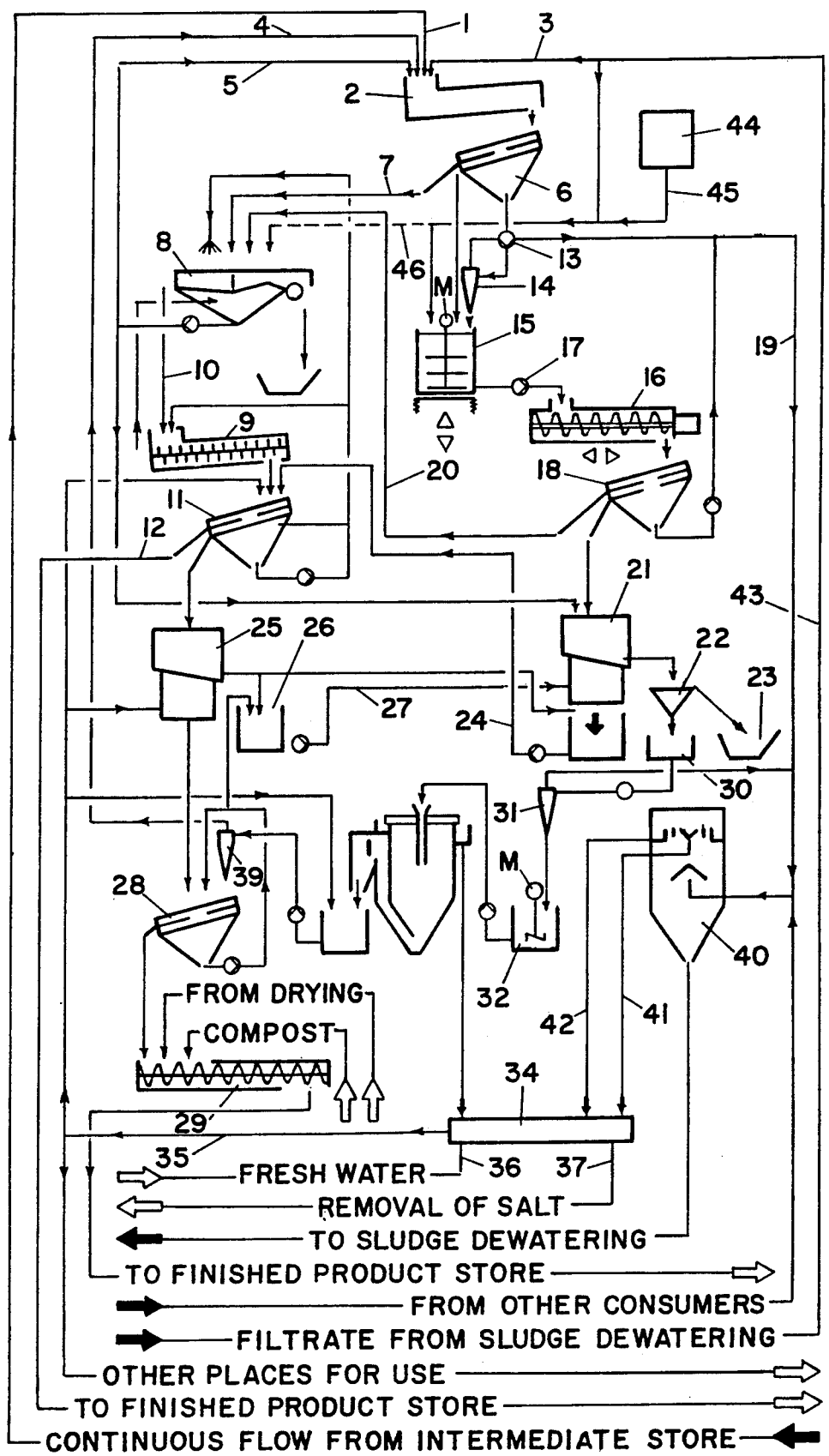
FIG. 1 is a schematic diagram of the extraction and waste-water preparation stage of a plant constructed in accordance with the present invention for removing pollutants from contaminated soil.

The method and apparatus of extraction according to the present invention is shown in FIG. 1. Contaminated crushed, screen soil is supplied from an intermediate store through line 1 to a sword washer 2. The mashing water is the filtrate from sludge dewatering supplied through line 3, or is repeatedly-used rinsing water, which is supplied to the sword washer through lines 4 and 5. Cohesive soil is broken up in the sword washer 2.

The resulting suspension is delivered to a screen 6 having an undersize of about 4 mm. The overflow from the screen flows through line 7 to a vibrating sorter 8 where the low-density materials are separated and the coarse fraction having a particle size over 4 mm is prewashed. The coarse fraction is then rinsed in a sword washer 9, to which it is supplied through line 10, and is dewatered on a double screen 11, additionally rinsed and then supplied to the finished-product store as a gravel fraction along line 12.

The undersize from screen 6 is delivered by a pump, 13 to a hydrocyclone 14 in which a fraction having a particle size of 0 to 150 $\mu$m, preferably 0 to 10 $\mu$m, is separated. The underflow from the hydrocyclone is delivered to a mashing and washing container 15 supplied with measured amounts of washing chemicals from a chemical preparation station 44 through a line 45. As shown by the chain line 46, washing chemicals can also be supplied to the coarse fraction at the vibration sorter 8. Intensive washing is carried out in the mashing container 15 by introducing mechanical energy through an agitator (not shown), which preferably is hydraulically driven and has an adjustable speed. Of course, the agitator can be combined with hydraulic or ultrasonic vibrating components. The extraction process is intensified by introducing vibration energy in the downstream extraction stage 16, where the outflow from container 15 is delivered by a pump 17. The resulting washed product is largely freed from washing water (the extraction agent) in a downstream oscillating screen 18. The washing water from screen 18 is then supplied to a concentration process (to be described herebelow) through a line 19. Alternatively, the gravelly constituents, i.e., >4 mm fraction, can optionally be conveyed through the washing and extraction stage 15, 16 before being separated in the downstream double screen 18 and supplied through line 20 to the vibrating sorter 8.

The material having a particle size of 0 to 4 mm is separated on the vibrating screen 18 and delivered to an up-current sorter 21, where it is acted upon in countercurrent by water from below and freed from low-density materials and adhering extraction solution. The low-density materials having a density up to 1.8 kg/dm$^3$ are separated in a screen 22 having a mesh of 0.2 to 0.5 mm and discharged into a container 23. The rinsed underflow, which has a particle size of 100 $\mu$m to 0.2 mm, is supplied by a pump through line 24 to the double screen 11, dewatered and delivered to an up-current sorter 25 for a second rinse and sorting by density. The rinsing water from this stage, including any residual low-density materials borne thereby, is supplied in a cascade though a pump station 26 and line 27 to the up-current sorter 21. The resulting purified product obtained in the up-current sorter 25, is dewatered in an end-product screen 28 and mixed in a mixing worm 29 with dried material having a particle size of 0 to preferably 10 $\mu$m and, if required, with compost for reanimating the soil and discharged to the finished-product store.

The fine substances flowing out from screen 22 and having a particle-size range from 10 to 150, preferably 10 to 100 $\mu$m, are supplied via a pump station 30 to a hydrocyclone 31, the underflow whereof is introduced into the pump station 32 of a pneumatic flotation unit 33. The flotation unit 33 is supplied with flotation chemicals and the low-density materials having a particle size of 10 to a maximum of 150 $\mu$m are floated out of the soil. They travel to a process-water preparation plant 34 where they are separated. The purified water is recirculated along line 35 to the extraction process. Fresh water is supplied to the preparation plant 34 via line 36. Part of the stream of process water is discharged through line 37, to keep the salt content constant.

The purified fine product obtained in the flotation plant 33 is sent via a pump station 38 to a multi-stage countercurrent hydrocyclone unit 39 in which it is rinsed in countercurrent, and is then supplied as a cover layer to the end-product screen 28.

The product overflowing in the hydrocyclone 14 and having a particle size of 0 to 150 $\mu$m, preferably 0 to 10 $\mu$m, is supplied to the thickener 40 and concentrated to about 8 to 15%. The concentrated product is mechanically dewatered and supplied for sludge drying in a manner to be described hereinbelow. The oil-containing overflow in the thickener 40 is sent along a line 41 to a flotation stage in the preparation plant 34, whereas the remaining waste water is sent through aline 42 into the stages of the preparation plant 34 downstream of the flotation stage. Normally the preparation plant 34 comprises a flotation stage followed by an oxidation or reduction stage, a precipitation and flocculation stage, a sedimentation stage, a filtration stage and blow-off column (stripper), an active carbon filter stage and a selective exchanger stage. Various stages are switched on or off, depending on the content of pollutants, so that the water is purified in accordance with legal regulations.

The sludge obtained during purification of the waste water at process water preparation plant 34 is mechanically dewatered by suitable means (not illustrated). It contains most of the pollutants in the soil. Some pollutants are in the deposited low-density materials such as coal, charcoal and tar, whereas a smaller proportion is obtained as a liquid product from the waste air over the active-carbon stage followed by steam regeneration. These are the volatile substances. Non-volatile floating or sedimentable substances are removed in the oil separator upstream of the flotation unit and are discharged as waste oil.

Figure 2:
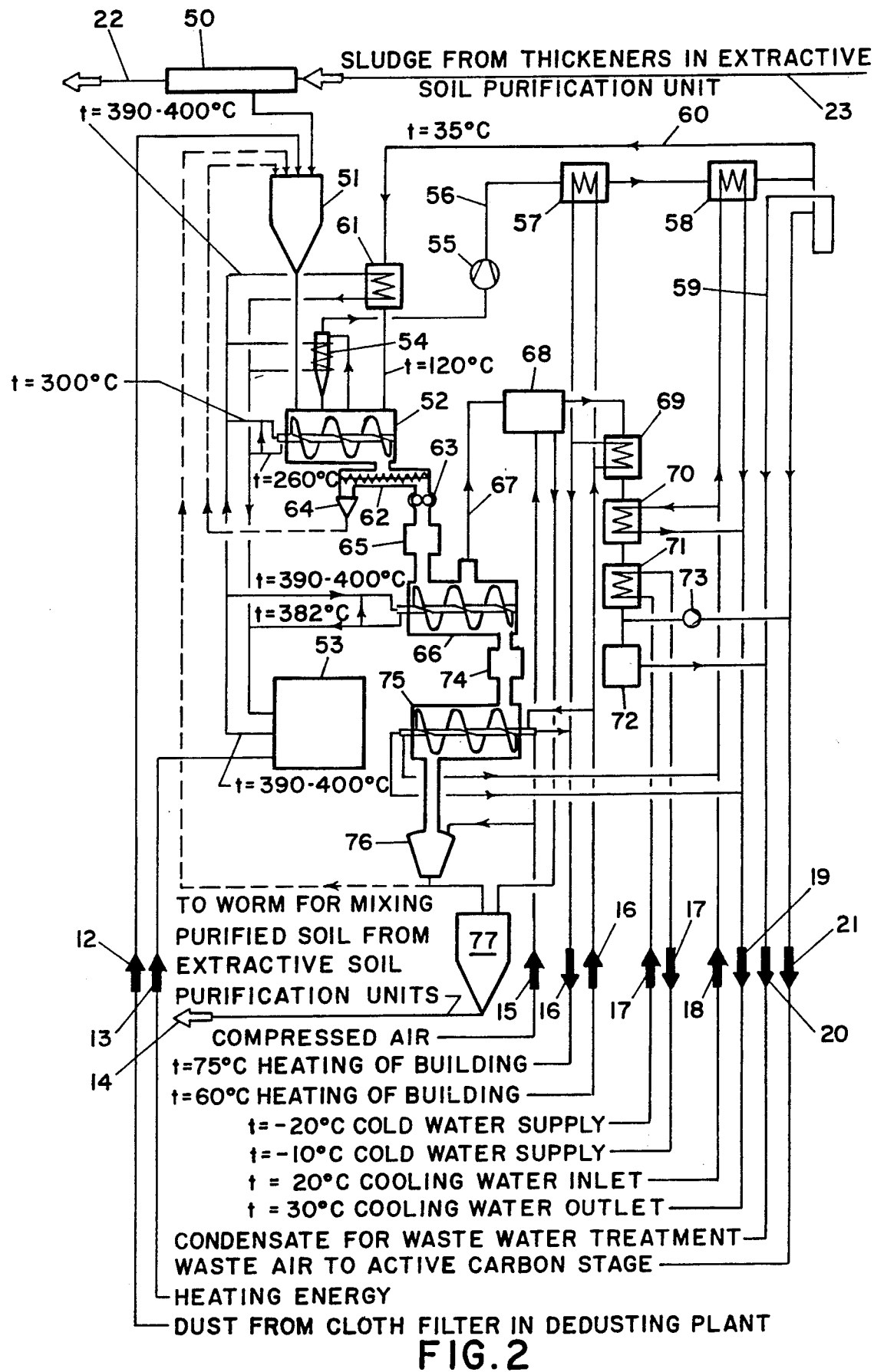
FIG. 2 is a schematic diagram of the dewatering, drying and distillation stage for purifying the very fine fraction obtained in the treatment stage of the plant depicted in FIG. 1.

The subsequent treatment of the sludge in the thickener 40 is shown in FIG. 2. The concentrated sludge is first sent to a mechanical dewatering device 50, in which it is dewatered down to a content of about 60% of dry substance. The resulting filtrate is sent to the extraction process or wastewater filtering unit via line 43 (FIG. 1), whereas the dewatered soil is supplied in uniform quantities via an intermediate silo 51 to a drier 52. The drier is supplied with steam or heat transfer medium from a heat generator 53. Preferably use is made of a worm drier comprising a hollow worm having a wall and surfaces used for heat transfer. The accompanying vapors are freed in multi-cyclones 54 from solids which are recirculated from the multi-cyclones to the drier. The vapors occurring at the head of the cyclone 54 are sent by a fan 55 and line 56 to a condenser 57. The energy obtained during the process can be used, for example, for heating the processing building. A downstream condenser 58 cools the waste air to about 25° C. The condensate is sent through line 59 to the waste-water separation and purification unit, whereas a part of the waste water at a temperature of about 35° C. is sent through a line 60 and a heater 61, where it is heated to a temperature of about 120° C., and returned as scavenging air to the drier 52. The heater 61 is supplied with steam or another medium from the heat generator 53. The soil treated in the worm drier 52 is withdrawn through a worm 62 and supplied to a mill 63 where it is deagglomerated. The worm 62 is constructed so that it can positively empty the drier 52 by delivering soil in the direction of the mill 62 and simultaneously in the opposite direction and into a pneumatic delivery system 64 for returning the soil to the silo 51.

The product leaving the mill 63 travels through a vacuum lock 65 to a vacuum distillation unit 66 in which the soil is heated by thermal oil or a fused salt bath to a temperature of preferably 380° C. (the product temperature).

The residence time in the vacuum distillation unit 66 is usually more than 1 hour. The resulting gases are drawn off through line 67 and are supplied to a first condensation stage 69 through a high-temperature filter 68, which is heated to avoid condensation and wherein the gases are de-dusted. The energy produced during the process can be used, for example, for heating the building. In the second condensation stage 70, the air is cooled with cooling water to a temperature of about 25° C. and in the third condensation stage 71 it is cooled to 5° C. by cold water and sols at a temperature of $-20°$ to $-25°$ C. The condensate is sent to the condensate pumping station 72 of the flotation unit to the wastewater purification unit 34. A water-ring vacuum pump 73 produces a negative pressure of 20 to 50 Torr abs for directing waste air to the active carbon filter stage of process water preparation plant or water purification unit 34. The additional water for driving the water-ring vacuum pump 73 is likewise supplied to the waste-water purification unit 34.

The purified soil from the vacuum distillation unit 66 is supplied through vacuum locks 74 to a cooler 75. The cooling energy required is likewise used for heating the building. The cooler is constructed in two stages. The temperature of the soil is reduced to about 40° to 50° with water in an after-cooler. The product is then conveyed by a pneumatic delivery device 76 to a silo 77 disposed above the mixing worm 29 (FIG. 1). The dust from the cloth filter in the dedusting unit, i.e., the unillustrated initial crushing station and screening station, is supplied to the intermediate silo 51 and purified via the aforementioned vacuum distillation system 66.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. A method of purifying contaminated soil from contaminants including organic pollutants, cyanide and mercury compounds, said method comprising the steps of:

separating from the contaminated soil a first particle size fraction no greater than minus 150 $\mu$m in size;

distilling the first particle size fraction in order to purify the first particle size fraction from organic pollutants and from cyanide and mercury compounds;

extracting contaminants from the balance of the contaminated soil by subjecting the balance of the contaminated soil to washing water in order to create a balance of washed soil;

separating the contaminant-bearing washing water from the washed soil;

rinsing the washed soil with rinsing water; and purifying the rinsing water from residual contaminants acquired thereby during said step of rinsing.

2. The method of claim 1 wherein said step of separating a first particle size fraction from the contaminated soil comprises separating a particle size fraction no greater than minus 10 μm in size.

3. The method of claim 2 wherein said step of distilling the first particle size fraction comprises distilling at a temperature from about 300° C. to about 600° C.

4. The method of claim 3 further comprising performing said step of distilling the first particle size fraction for ½ to 2 hours.

5. The method of claim 4 wherein said step of distilling the first particle size fraction further comprises distilling in vacuo.

6. The method of claim 5 wherein said step of distilling the first particle size fraction further comprises distilling in vacuo at a vacuum of 20 to 100 Torr absolute and at a temperature of approximately 380° C.

7. The method of claim 1 further comprising including washing additives in said washing water.

8. The method of claim 1 further comprising supplying mechanical energy to the contaminated soil during washing thereof.

9. The method of claim 1 wherein said step of separating a first particle size fraction from said contaminated soil comprises separating by dry sorting.

10. The method of claim 1 wherein said step of separating a first particle size fraction from said contaminated soil comprises separating by wet sorting.

11. The method of claim 10 further comprising drying the wet-sorted first particle size fraction prior to said step of distilling.

12. The method of claim 11 further comprising performing said step of drying by indirect heating.

13. The method of claim 11 further comprising the steps of thickness, dewatering and deagglomerating the first particle size fraction prior to the step of drying the first particle size fraction.

14. The method of claim 1 wherein said step of rinsing the washed soil comprises rinsing in counter-current.

15. The method of claim 2 wherein said step of rinsing the washed soil comprises rinsing in counter-current for freeing the washed soil from residual washing water and low-density materials having a density generally less than about 1.8 kg/dm³ and for simultaneously separating from the washed soil a second particle size fraction of plus 100 μm to minus 4 mm in size.

16. The method of claim 15 further comprising rinsing the second particle size fraction a second time for freeing the second particle size fraction from residual quantities of said low-density materials.

17. The method of claim 16 wherein the step of rinsing the second particle size fraction a second time comprises rinsing in counter-current.

18. The method of claim 17 further comprising introducing rinsing water used in said step of rinsing the second particle size fraction a second time into means for rinsing the washed soil whereby the rinsing water used in said step of rinsing the second particle size fraction a second time is also used as rinsing water for the washed soil.

19. The method of claim 18 further comprising dewatering the second particle size fraction, mixing the second particle size fraction with the first particle size fraction after distillation thereof, and discharging the mixture as purified soil.

20. The method of claim 15 further comprising freeing a remaining particle size fraction of plus 10 μm to minus 100 μm of the washed soil from said low-density materials by flotation.

21. The method of claim 20 further comprising performing said flotation upstream of and prior to said step of purifying the rinsing water.

22. The method of claim 20 further comprising rinsing the remaining particle size fraction of the washed soil in a counter-current hydrocyclone.

23. The method of claim 1 further comprising, prior to said step of separating a first particle size fraction from said contaminated soil, separating from the contaminated soil a particle size fraction of plus 4 mm in size.

24. The method of claim 23 further comprising extracting from the separated plus 4 mm fraction low-density materials having a density less than about 1.8 kg/dm³, rinsing the separated plus 4 mm fraction, dewatering the separated plus 4 mm fraction, additionally washing the separated plus 4 mm fraction, and discharging the separated plus 4 mm fraction as a gravel fraction.

25. The method of claim 1 further comprising, after said step of extracting contaminants from the balance of the contaminated soil by subjecting the balance of the contaminated soil to washing water in order to create a balance of washed soil, separating from the washed soil a particle size fraction of plus 4 mm in size.

26. The method of claim 25 further comprising rinsing the separated plus 4 mm fraction, dewatering the separated plus 4 mm fraction, additionally washing the separated plus 4 mm fraction, and discharging the separate plus 4 mm fraction as a gravel fraction.

27. The method of claim 11 further comprising removing solids from vapors produced during said step of distilling.

28. The method of claim 27 further comprising returning the solids removed from the vapors produced during said step of distilling to a means for drying said first particle size fraction.

29. The method of claim 27 further comprising condensing the vapors produced during said step of distilling in order to recover heat energy of the vapors.

30. The method of claim 29 further comprising purifying condensate occurring during condensing of the vapors produced during said step of distilling.

31. The method of claim 30 further comprising returning as scavenging air to said means for drying waste air heated to a temperature of about 120° C. occurring as a result of condensation of the vapors produced during said step of distilling.

32. The method of claim 12 further comprising performing said indirect heating using thermal oil as a heat transfer medium.

33. The method of claim 12 further comprising performing said indirect heating using fused salt baths as a heating method.

* * * * *